(12) United States Patent
Schuler et al.

(10) Patent No.: US 10,961,886 B2
(45) Date of Patent: Mar. 30, 2021

(54) PARTICLE FILTER WITH SCR-ACTIVE COATING

(71) Applicant: Umicore AG & Co. KG, Hanau-Wolfgang (DE)

(72) Inventors: Anke Schuler, Niedernberg (DE); Franz Dornhaus, Kobe (JP)

(73) Assignee: Umicore AG & Co. KG, Hanau-Wolfgang (DE)

(*) Notice: Subject to any disclaimer, the term of this patent is extended or adjusted under 35 U.S.C. 154(b) by 0 days.

(21) Appl. No.: 16/334,113

(22) PCT Filed: Sep. 20, 2017

(86) PCT No.: PCT/EP2017/073692
§ 371 (c)(1),
(2) Date: Mar. 18, 2019

(87) PCT Pub. No.: WO2018/054928
PCT Pub. Date: Mar. 29, 2018

(65) Prior Publication Data
US 2019/0368399 A1    Dec. 5, 2019

(30) Foreign Application Priority Data
Sep. 20, 2016    (EP) .................................. 16189565

(51) Int. Cl.
| | |
|---|---|
| *B01J 29/068* | (2006.01) |
| *F01N 3/035* | (2006.01) |
| *B01J 23/44* | (2006.01) |
| *B01J 29/76* | (2006.01) |
| *B01J 35/00* | (2006.01) |
| *F01N 3/20* | (2006.01) |
| *B01J 29/072* | (2006.01) |
| *B01J 29/064* | (2006.01) |
| *B01J 29/72* | (2006.01) |
| *B01J 29/74* | (2006.01) |
| *B01J 21/06* | (2006.01) |
| *B01J 21/12* | (2006.01) |
| *B01J 21/10* | (2006.01) |
| *B01J 35/04* | (2006.01) |
| *B01J 37/02* | (2006.01) |
| *B01D 53/94* | (2006.01) |

(52) U.S. Cl.
CPC ......... *F01N 3/035* (2013.01); *B01D 53/9418* (2013.01); *B01J 21/063* (2013.01); *B01J 21/10* (2013.01); *B01J 21/12* (2013.01); *B01J 23/44* (2013.01); *B01J 29/064* (2013.01); *B01J 29/068* (2013.01); *B01J 29/072* (2013.01); *B01J 29/723* (2013.01); *B01J 29/743* (2013.01); *B01J 29/763* (2013.01); *B01J 35/0006* (2013.01); *B01J 35/04* (2013.01); *B01J 37/0246* (2013.01); *F01N 3/2066* (2013.01); *B01D 2255/1023* (2013.01); *B01D 2255/20738* (2013.01); *B01D 2255/20761* (2013.01); *B01D 2255/915* (2013.01); *B01D 2255/9155* (2013.01); *B01D 2258/012* (2013.01); *F01N 2370/04* (2013.01)

(58) Field of Classification Search
CPC ...... B01J 29/763; B01J 29/743; B01J 29/723; B01J 29/064; B01J 29/068; B01J 29/072; B01J 35/04; B01J 35/0006; B01J 37/0246; B01J 37/0248; B01J 23/44; B01J 21/12; B01J 21/063; B01J 21/10; B01D 53/9418; B01D 2255/20738; B01D 2255/1023; B01D 2255/20761; B01D 2255/9155; B01D 2255/50; B01D 2255/915; B01D 2258/012; Y02T 10/24; Y02T 10/12; F01N 2370/04; F01N 3/035; F01N 3/2066; F01N 2610/02; F01N 2510/063; F01N 2570/14
USPC .............. 502/60, 63, 64, 66, 69, 74, 527.18, 502/527.23, 527.24; 422/177, 180, 184.1
See application file for complete search history.

(56) References Cited

U.S. PATENT DOCUMENTS

| | | | |
|---|---|---|---|
| 2010/0034717 | A1 | 2/2010 | Adelmann et al. |
| 2011/0078997 | A1 | 4/2011 | Boorse et al. |
| 2011/0126525 | A1 | 6/2011 | Han |
| 2011/0142737 | A1 | 6/2011 | Seyler et al. |
| 2011/0146237 | A1 | 6/2011 | Adelmann et al. |

(Continued)

FOREIGN PATENT DOCUMENTS

| | | |
|---|---|---|
| DE | 102007057305 A1 | 6/2009 |
| DE | 102015107647 A1 | 3/2015 |

(Continued)

OTHER PUBLICATIONS

International Preliminary Report on Patentability received in PCT/EP2017/073692 dated Mar. 26, 2019.

(Continued)

*Primary Examiner* — Elizabeth D Wood
(74) *Attorney, Agent, or Firm* — Suzannah K. Sundby, Esq.; Canady + Lortz LLP

(57) ABSTRACT

The present invention relates to a particle filter which comprises a wall-flow filter and SCR-catalytically active material, wherein the wall-flow filter comprises ducts which extend in parallel between a first and a second end of the wall-flow filter and which are alternately closed off in gas-type fashion either at the first or at the second end and which are separated by porous walls, and wherein the SCR-active material comprises a zeolite which is exchanged with copper and/or iron and which is situated in the form of a coating in the porous walls of the wall-flow filter, characterized in that the SCR-catalytically active coating comprises palladium.

11 Claims, 2 Drawing Sheets

(56) References Cited

U.S. PATENT DOCUMENTS

Figure 1:
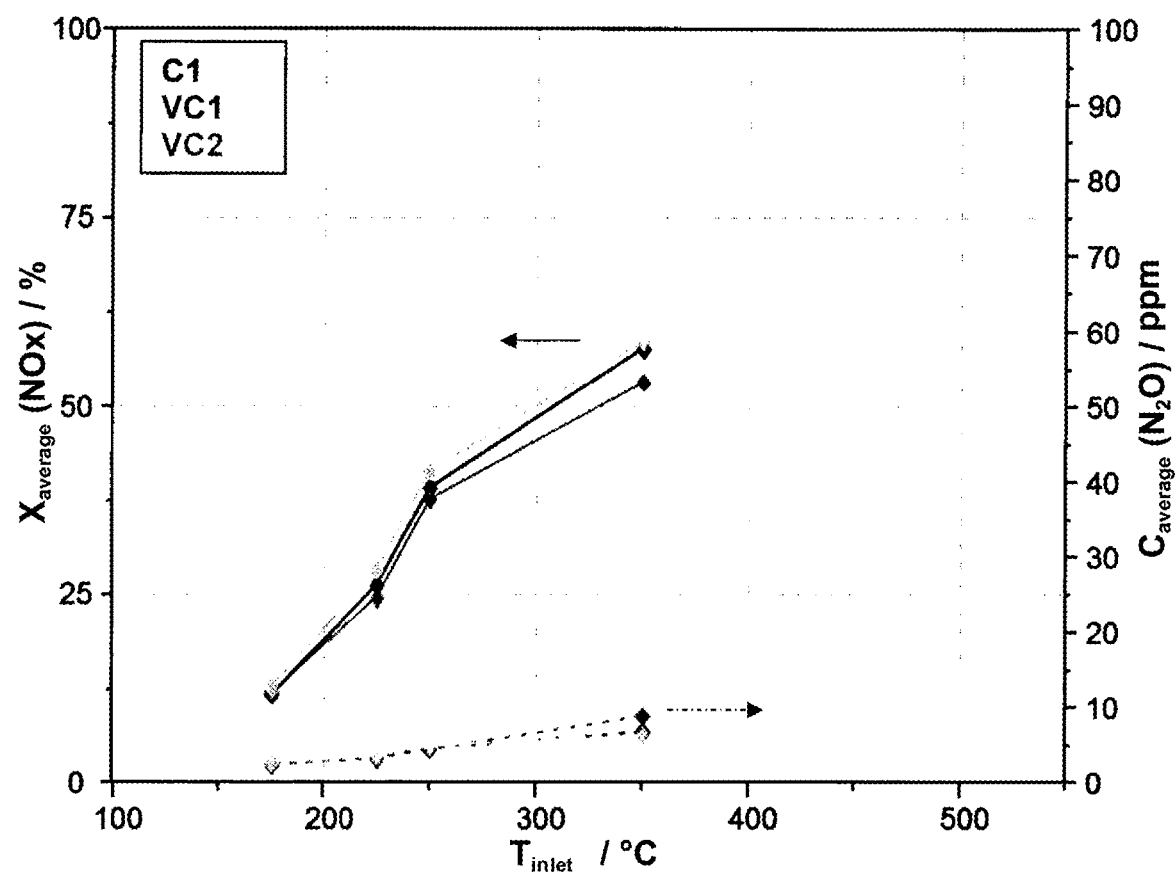

| | | |
|---|---|---|
| 2011/0274601 A1 | 11/2011 | Boorse |
| 2012/0107203 A1* | 5/2012 | Arnold .................. B01J 29/505 |
| | | 423/213.5 |
| 2012/0186229 A1 | 7/2012 | Phillips et al. |
| 2013/0121902 A1 | 5/2013 | Adelmann et al. |
| 2013/0216441 A1 | 8/2013 | Johansen |
| 2015/0152768 A1* | 6/2015 | Arulraj ................ B01D 46/247 |
| | | 428/117 |
| 2016/0008759 A1 | 1/2016 | Sonntag |
| 2016/0053644 A1 | 2/2016 | Johansen et al. |
| 2016/0136626 A1* | 5/2016 | Phillips ............. B01D 53/9422 |
| | | 423/239.2 |
| 2017/0304812 A1* | 10/2017 | Casci ..................... B01D 53/02 |

FOREIGN PATENT DOCUMENTS

| | | |
|---|---|---|
| EP | 0174495 A1 | 3/1986 |
| EP | 1493484 A1 | 1/2005 |
| EP | 1916029 A1 | 4/2008 |
| EP | 2335810 A1 | 6/2011 |
| JP | H01151706 A | 6/1989 |
| JP | 2013139035 A | 7/2013 |
| WO | 2005016497 A1 | 2/2005 |
| WO | 2008049491 A1 | 5/2008 |
| WO | 2008061752 A2 | 5/2008 |
| WO | 2009124643 A1 | 10/2009 |
| WO | 2011116907 A2 | 9/2011 |
| WO | 2011131324 A1 | 10/2011 |
| WO | 2012168277 A1 | 12/2012 |
| WO | 2016094399 A1 | 6/2016 |

OTHER PUBLICATIONS

International Search Report received in PCT/EP2017/073692 dated Nov. 10, 2017.
Written Opinion received in PCT/EP2017/073692 dated Nov. 10, 2017.
Shan et al., "The use of ceria for the selective catalytic reduction of NOx with NH3", Aug. 23, 2014, pp. 1251-1259, vol. 35, No. 8, Publisher: Chinese Journal of Catalysis.
Office Action received in IN201947010881, dated Nov. 27, 2020.

* cited by examiner

PARTICLE FILTER WITH SCR-ACTIVE COATING

The present invention relates to a particle filter with SCR-active coating for simultaneous reduction of particles and nitrogen oxides in the exhaust gas of combustion engines.

Exhaust gases from motor vehicles with a predominantly lean-operated combustion engine contain, in particular, the primary emissions of carbon monoxide CO, hydrocarbons HC, and nitrogen oxides NOx in addition to particle emissions. Due to the relatively high oxygen content of up to 15 vol. %, carbon monoxide and hydrocarbons may relatively easily be rendered harmless by means of oxidation; however, reducing nitrogen oxides to nitrogen is much more difficult.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

The ammonia used as reducing agent may be made available by feeding an ammonia precursor compound, for example urea, ammonium carbamate, or ammonium formate, into the exhaust gas stream, and by subsequent hydrolysis.

Particles mainly consist of carbon and may be very effectively removed from the exhaust gas with the aid of particle filters. Wall-flow filters made from ceramic materials have especially proven themselves. These wall-flow filters are made up of a plurality of parallel ducts that are formed by porous walls. The ducts are alternately sealed in a gas-tight manner at one of the two ends of the filter so that ducts A, which are open at the first side of the filter and sealed at the second side of the filter, and ducts B, which are sealed at the first side of the filter and open at the second side of the filter, are formed. The exhaust gas flowing into ducts A, for example, may leave the filter again only via the ducts B and must, for this purpose, flow through the porous walls between the ducts A and B. The particles are retained when the exhaust gas passes through the wall.

Particles retained by the filter must be removed from time to time or continuously in order to avoid a too-high back pressure of the filter or even its clogging. This in particular takes place by burning the carbon with oxygen at elevated temperatures of about 600° C.

It is also already known to coat wall-flow filters with SCR-active material and to thus simultaneously remove particles and nitrogen oxides from the exhaust gas.

Insofar as the required quantity of SCR-active material is applied onto the porous walls between the ducts (what is known as on-wall coating), this may however lead to an unacceptable increase in the back pressure of the filter.

With this as the background, JPH01-151706 and WO2005/016497 A1, for example, propose to coat a wall-flow filter with an SCR catalyst such that the latter penetrates the porous walls (what is known as in-wall coating).

Important requirements for the combination of a particle filter with an SCR catalyst are in particular the low-temperature activity for normal driving operation, the activity with regard to NOx conversion as well as the minimization of CO and HC secondary emissions during filter regeneration. Moreover, an SCR catalyst should have the highest possible selectivity, i.e. it should form as little dinitrogen monoxide as possible.

The object of the present invention is to provide wall-flow filters that are coated with SCR catalysts and that meet the requirements mentioned.

The present invention relates to a particle filter comprising a wall-flow filter and SCR-active material, wherein the wall-flow filter comprises ducts which extend in parallel between a first and a second end of the wall-flow filter, which are alternatingly closed off in gas-tight fashion either at the first or at the second end, and which are separated by porous walls, and wherein the SCR-active material contains a zeolite exchanged with copper and/or iron and located in the form of a coating in the porous walls of the wall-flow filter, characterized in that the SCR-active material contains palladium.

In one embodiment of the present invention, the palladium is homogeneously distributed in the SCR-active material.

In a further embodiment of the present invention, the palladium is supported on a carrier material.

All materials that are known to the person skilled in the art for this purpose are considered as carrier material for the palladium. Such materials have a BET surface area of 30 to 250 $m^2/g$, preferably from 100 to 200 $m^2/g$ (specified according to DIN 66132), and are, in particular, aluminum oxide, silicon oxide, magnesium oxide, titanium oxide, and mixtures or mixed oxides thereof.

Aluminum oxide and aluminum/silicon mixed oxides are preferred. If aluminum oxide is used, it is particularly preferably stabilized, for example with lanthanum oxide.

The coating of the carrier material with palladium is effected by known methods, for example according to the incipient wetness method or an injection method, in each case using water-soluble palladium compounds.

However, in embodiments of the present invention, the SCR-active material may also serve as support for the palladium. In this case, the palladium is thus present directly on the SCR-active material.

It is also conceivable that a portion of the palladium is supported directly on the SCR-active material and another portion is supported on a separate carrier material.

In embodiments of the present invention, the SCR-active coating contains palladium in amounts of 10 to 1000 ppm, preferably 50 to 500 ppm, in each case in relation to the SCR-active material.

Wall-flow filters that may be used according to the present invention are known and commercially available. They consist, for example, of silicon carbide, aluminum titanate or cordierite.

In the uncoated state, they have porosities of from 30 to 80, in particular 50 to 75%, for example. In the uncoated state, their average pore size is 5 to 30 micrometers, for example.

Generally, the pores of the wall-flow filter are so-called open pores, that is, they have a connection to the ducts. Furthermore, the pores are normally interconnected with one another. This enables easy coating of the inner pore surfaces on the one hand and, on the other, an easy passage of the exhaust gas through the porous walls of the wall-flow filter.

In the context of the present invention, the term "SCR-active material" is understood to mean materials which contain an SCR catalyst and palladium or which consist of an SCR catalyst and palladium.

In embodiments of the present invention, small-pore zeolites exchanged with copper and/or iron are used as the SCR catalyst zeolites.

Small-pore zeolites have a maximum ring size of eight tetrahedral atoms and are, in particular, those that belong to the structure types AEI, AFX, CHA (chabazite), ERI (erionite), LEV (levyne), and KFI. The structure types AEI, chabazite and levyne are particularly preferred.

Within the scope of the present invention, coming under the term "zeolite" are not only aluminosilicates but also silicoaluminophosphates, which are occasionally also referred to as zeolite-like compounds. Silicoaluminophosphates to be used according to the invention also belong in particular to the structure types AEI, CHA (chabazite), ERI (erionite), LEV (levyne), and KFI. Examples are SAPO-34 and SAPO-35.

The specified zeolites are exchanged with iron and/or copper, in particular with copper. The amounts of iron or copper are, in particular, 0.2 to 6 wt. %, calculated as $Fe_2O_3$ or CuO and based on the total weight of the exchanged zeolites.

In embodiments of the present invention, the SCR-active material comprises an SCR catalyst, which contains a copper-exchanged zeolite, and palladium, or it consists of a copper-exchanged zeolite and palladium.

In embodiments of the present invention, the SCR-catalytically active material comprises a copper-exchanged zeolite of the chabazite type as well as palladium or it consists of a copper-exchanged zeolite of the chabazite type and palladium and/or palladium supported on a carrier material.

In other embodiments of the present invention, the SCR-catalytically active material comprises a copper-exchanged zeolite of the levyne type as well as palladium or it consists of a copper-exchanged zeolite of the levyne type and palladium and/or palladium supported on a carrier material.

In other embodiments of the present invention, the SCR-catalytically active material comprises a copper-exchanged zeolite of the AEI type as well as palladium or it consists of a copper-exchanged zeolite of the AEI type and palladium and/or palladium supported on a carrier material.

In a further embodiment of the present invention, the amount of coating with SCR-active material is 70 to 150, in particular 90 to 130 g/L, in relation to the volume of the wall-flow filter.

The manufacturing of the particle filter according to the invention may take place according to methods familiar to the person skilled in the art, e.g., according to the typical dip-coating method or pump and suction coating method with subsequent thermal post-treatment or calcination. It is known to the person skilled in the art that the average pore size of the wall-flow filter and the average particle size of the SCR-catalytically active materials have to be adapted to each other in order to achieve an on-wall coating or an in-wall coating. In-wall coating, i.e. coating the inner pore surfaces of the porous walls, is preferred. In this instance, the average particle size of the SCR-catalytically active materials must be small enough to penetrate into the pores of the wall-flow filter.

The invention is explained in more detail in the following examples and figures.

EXAMPLE 1

A commercially available zeolite of the structure type chabazite was exchanged with copper by means of copper acetate so that the copper content was 3.5 wt. % in relation to CuO. Palladium supported on a commercially available carrier material of alumina doped with silicon dioxide was added to the obtained suspension. The amount was calculated in such a way that the content of palladium was 200 ppm in relation to the total solids of the suspension.

A commercially available wall-flow filter of silicon carbide was coated "in-wall" with the resulting suspension.

The SCR-active coated wall-flow filter obtained in this way is subsequently referred to as C1.

COMPARATIVE EXAMPLE 1

Example 1 was repeated with the difference that palladium was not added to the suspension.

The SCR-active coated wall-flow filter obtained in this way is subsequently referred to as VC1.

COMPARATIVE EXAMPLE 2

Example 1 was repeated with the difference that 200 ppm of supported platinum instead of supported palladium was added to the suspension.

The SCR-active coated wall-flow filter obtained in this way is subsequently referred to as VC2.

COMPARATIVE EXPERIMENTS

Figure 2:
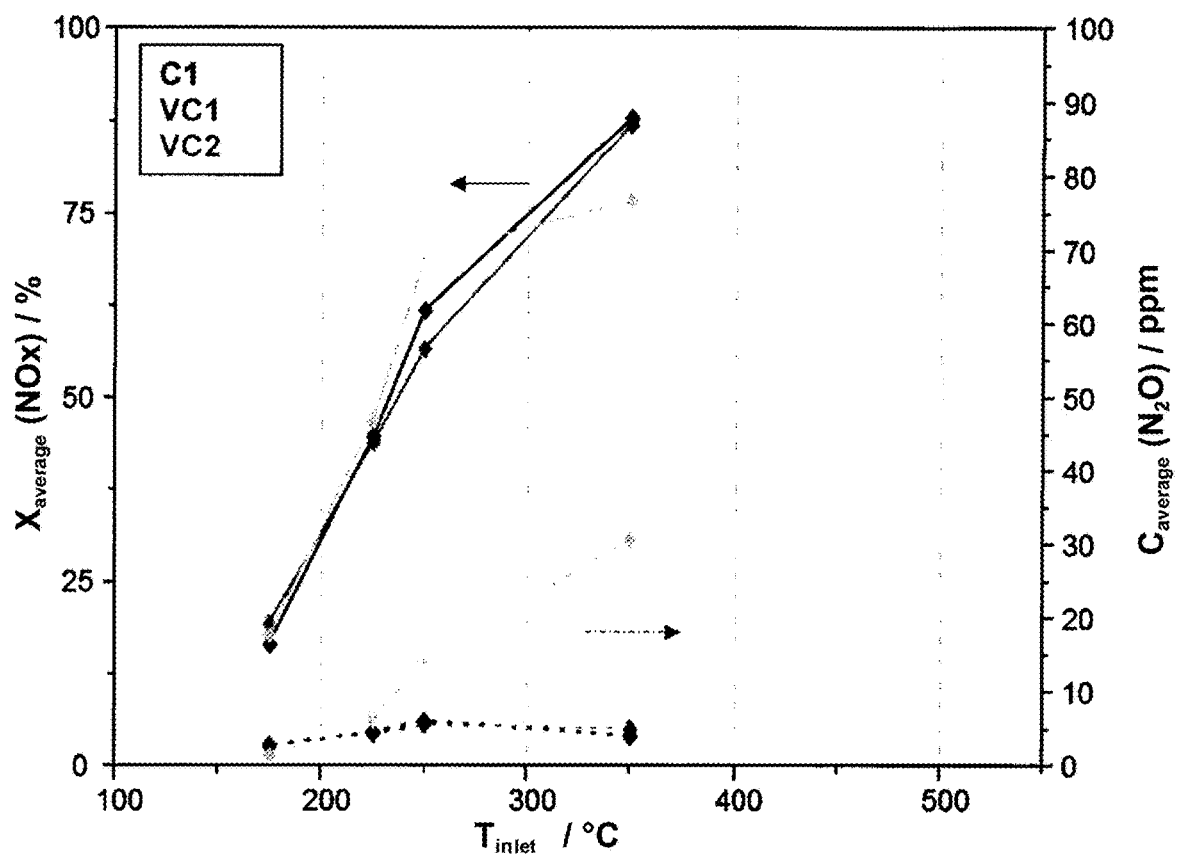

Determining the NOx Conversion of C1, VC1 and VC2
a) First, C1, VC1 and VC2 were aged for 16 hours at 800° C. in hydrothermal atmosphere (10% $H_2O$, 10% $O_2$, remainder $N_2$) (for comparison, fresh catalysts C1, VC1 and VC2 were also compared, see FIG. 2)
b) The NOx conversion of the particle filter C1 according to the invention and of the comparative particle filters VC1 and VC1 [sic] as a function of the temperature upstream of the catalyst was determined in a model gas reactor in the so-called NOx conversion test. This NOx conversion test consists of a test procedure that comprises a pretreatment and a test cycle that is run through for various target temperatures. The applied gas mixtures are noted in Table 1.

Test Procedure:
1. Preconditioning at 600° C. in $N_2$ for 10 min
2. Test cycle repeated for the target temperatures
   a. Bringing up to the target temperature in gas mixture 1
   b. Addition of $NO_x$ (gas mixture 2)
   c. Addition of $NH_3$ (gas mixture 3), waiting until $NH_3$ breakthrough>20 ppm, or a maximum of 30 min duration
   d. Temperature-programmed desorption up to 500° C. (gas mixture 3)

TABLE 1

Gas mixtures of the NOx conversion test.

| | Gas mixture | | |
|---|---|---|---|
| | 1 | 2 | 3 |
| $N_2$ | Balance | Balance | Balance |
| $O_2$ | 10 percent by volume | 10 percent by volume | 10 percent by volume |
| NOx | 0 ppm | 500 ppm | 500 ppm |
| $NO_2$ | 0 ppm | 0 ppm | 0 ppm |
| $NH_3$ | 0 ppm | 0 ppm | 750 ppm |
| CO | 350 ppm | 350 ppm | 350 ppm |
| $C_3H_6$ | 100 ppm | 100 ppm | 100 ppm |
| $H_2O$ | 5 percent by volume | 5 percent by volume | 5 percent by volume |
| GHSV/h−1 | 60,000 | 60,000 | 60,000 |

The average conversion for the test procedure range 2c is determined for each temperature point. Plotting the average NOx conversion for the various temperature points results in a plot as shown in FIGS. 1 and 2. FIG. 1 shows the average NOx conversions and the $N_2O$ formation of the catalysts aged at 800° C. and FIG. 2 shows the results of the fresh catalyst samples.

It can be seen in FIGS. 1 and 2 that C1 and VC2 have significantly improved average NOx conversions compared to VC1. This is due to the presence of palladium or platinum. Compared to VC2, however, C1 forms substantially less $N_2O$, i.e. has a consistently better selectivity.

The invention claimed is:

1. A particle filter comprising a wall-flow filter and an in-wall coating of an SCR-active material and palladium,
    wherein the wall-flow filter comprises ducts which extend in parallel between a first and a second end of the wall-flow filter, which are alternatingly closed off in gas-tight fashion either at the first or at the second end, and which are separated by porous walls having pores,
    wherein the SCR-active material comprises a zeolite exchanged with copper and/or iron, and
    wherein the SCR-active material and the palladium has penetrated the pores of the porous walls and thereby coats the inner pore surfaces of the porous walls.

2. The particle filter according to claim 1, wherein the palladium is homogeneously distributed in the SCR-active material.

3. The particle filter according to claim 1, wherein the palladium is supported on a carrier material.

4. The particle filter according to claim 3, wherein the carrier material has a BET surface area of 30 to 250 $m^2/g$ (determined in accordance with DIN 66132).

5. The particle filter according to claim 4, wherein the carrier material is aluminum oxide, silicon oxide, magnesium oxide, titanium oxide, or a mixture or a mixed oxide of at least two of these oxides.

6. The particle filter according to claim 1, wherein the in-wall coating contains palladium in amounts of 10 to 1000 ppm in relation to the SCR-active material.

7. The particle filter according to claim 1, wherein the SCR-active material contains a small-pore zeolite that is exchanged with copper and/or iron.

8. The particle filter according to claim 7, wherein the small-pore zeolite belongs to one of the structure types AEI, CHA (chabazite), ERI (erionite), LEV (levyne), and KFI.

9. The particle filter according to claim 1, wherein the SCR-active material
    (a) contains a copper-exchanged zeolite of the chabazite type and palladium,
    (b) consists of a copper-exchanged zeolite of the chabazite type and palladium, or
    (c) consists of a copper-exchanged zeolite of the chabazite type and palladium supported on a carrier material.

10. The particle filter according to claim 1, wherein the SCR-active material
    (a) contains a copper-exchanged zeolite of the levyne type,
    (b) consists of a copper-exchanged zeolite of the levyne type and palladium, or
    (c) consists of a copper-exchanged zeolite of the levyne type and palladium supported on a carrier material.

11. The particle filter according to claim 1, wherein the SCR-active material
    (a) contains a copper-exchanged zeolite of the AEI type,
    (b) consists of a copper-exchanged zeolite of the AEI type and palladium, or
    (c) consists of a copper-exchanged zeolite of the AEI type and palladium supported on a carrier material.

\* \* \* \* \*